June 27, 1967 C. LENZ 3,327,612
APPARATUS FOR USE IN BREWING
Filed Nov. 16, 1964
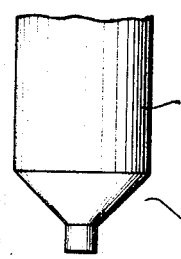
*FIG.1*   *FIG.2*
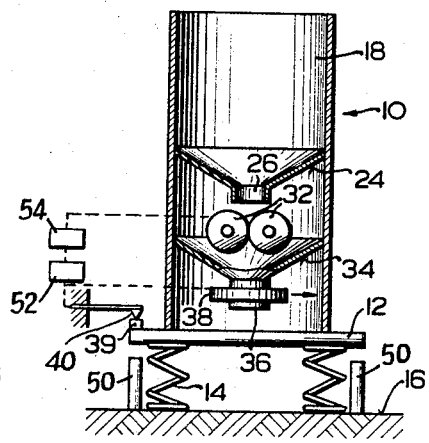
INVENTOR
CONRAD LENZ
*McGlew & Toren*
ATTORNEYS.

United States Patent Office 3,327,612
Patented June 27, 1967

3,327,612
APPARATUS FOR USE IN BREWING
Conrad Lenz, 2 Annenhofstrasse, 805 Freising,
Upper Bavaria, Germany
Filed Nov. 16, 1964, Ser. No. 411,327
Claims priority, application Germany, Jan. 31, 1964,
L 46,934
6 Claims. (Cl. 99—278)

This invention relates, in general, to brewing apparatus and, in particular, to a new and useful mashing device comprising a unit consisting of a tank for receiving the soaked malt, a feed grinder for the soaked malt and a conveyor for moving the crushed material from the outlet of the feed grinder to a brewing pan or mash copper and of means actuated by the emptying of the unit of the mashed material to discontinue the driving mechanisms.

Modern mashing apparatus is frequently built as a unit consisting of: a tank for receiving the soaked malt, a feed grinder, and a conveyor, principally a pump, for moving the crushed material from the outlet of the feed grinder to the brewing pan or, in some instances, to an interposed mash copper. The tank for receiving the soaked malt is arranged adjacent a storage silo in which the malt is stored. Conveyor means are provided to move the malt from the storage silo to the tank for the soaked malt. The soaking of the malt can be effected in the storage silo, or on the way from the storage silo to the tank, or in the tank itself. There is a need to stop the driving mechanisms of the mashing apparatus automatically. Such driving mechanisms comprise the feed grinder and a conveyor provided between the outlet of the feed grinder and the brewing pan or the mash copper and they must be stopped when the charge of the soaked malt is used up in the tank. If the charges in the tank are always the same, then the stoppage can be effected in dependence upon the respective running time of these driving mechanisms, and means such as a clock could be used to automatically stop such mechanisms after a certain running time. The charges in the tank for the soaked material, however, are not always exactly equal. This is because it is not possible to keep the charges exactly equal in the transfer of the malt from the storage silo to the tank and also because it may be desirable to have sometimes a larger and sometimes a smaller charge, depending on the respective requirements of the operation. Bearing in mind that it is not always desirable to produce the same amount of work and that different amounts of crushed malt are required for different types of beer, it becomes highly desirable to regulate the feeding operations to and from the malt soaking tank.

In accordance with the inveniton, the disadvantages of the prior art, including the timing mechanisms, are overcome by providing a mashing apparatus with means to positively stop the driving mechanisms after the respective charge has been worked up independent of any variations in the amount of charge which is delivered for a given period of time. In a preferred arrangement, the apparatus, including the tank, the crushing rollers, and the delivery pump are contained in a single unit which is mounted in a resilient manner such as by springs which cause the elevation of the unit, when it becomes emptied, and permit the depression or downward movement of the unit when it is relatively full under the weight of the charge. The apparatus advantageously includes a signal transmitter which is actuated in dependence on the position of the spring supported parts of the device. This provides a positive means for actuating the feed mechanisms in dependence on the position of the spring supported parts as determined by the strength of the spring supports on the one hand and the weight of the supported parts, including the weight of the charge in the tank, on the other hand.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

In the drawings:

FIG. 1 is a somewhat schematic partly side elevational and partly sectional view of a brewing apparatus constructed in accordance with the invention; and FIG. 2 is a partial sectional view of the apparatus indicated in FIG. 1 with the mash tank in the empty state.

Referring to the drawings in particular, the invention embodied therein comprises a mashing apparatus, generally designated 10, which is supported on a base plate 12 which is carried on upward biasing means or spring elements 14, such as compression springs, and which in the full position, as indicated in FIG. 1, will fully compress the springs and rest on upstanding supporting elements 50, 50 mounted on the ground 16.

In accordance with the invention, the mashing apparatus includes a tank 18 for the soaked malt. The tank 18 is charged with malt through a conveyor 20 which receives malt from a storage silo 22. The soaking of the malt is effected by adding moisture either to the silo 22, the conveyor 20 or the tank 18. The mashing apparatus also includes a feed grinder or bruising mill, generally designated 30, comprising two rotatable rollers 32 arranged below a central opening 26 in a funnel-shaped hopper 24 at the bottom end of the tank 18. The mashing apparatus further includes a hopper 34 arranged below the feed grinder 30 having an opening 36 aligned with the nip of the rollers 32. The material crushed in the feed grinder 30 is carried off by a conveyor such as an electrical pump 38 which delivers the crushed material through a conduit (not shown) to the brewing pan which is also not represented.

A feature of the invention is that the device is operated in accordance with the amount of material which is contained in the tank 18 and which influences the elevation at which the supporting platform 12 carrying the mashing apparatus 10 is located. The plate 12 carries a moving contact 39, which is arranged in alignment with a stationary contact 40 which, in the embodiment illustrated, is positioned thereabove. In the position of FIG. 1, the circuit to which the contacts 39 and 40 are connected is open. Closure of the contacts 39 and 40 is effective to operate controls 52 and 54 which act to discontinue the operation of the rollers 32 and the pump 38.

As indicated in FIG. 2, the contacts 39 and 40 are closed when the tank 18 is completely or substantially completely emptied. In this position, the spring 14 cause the platform 12 to be moved upwardly due to the lesser weight in the tank 18 to cause the contacts to meet.

While a specific embodiment of the invention has been shown and described in detail to illustrate the application of the principles of the invention, it will be understood that this invention may be embodied otherwise without departing from such principles.

The embodiments of the invention in which an exclusive property or privilege is claimed are defined as follows:

1. A mashing device, comprising a receiving tank for malt, a feed grinder located in alignment with said tank in a position for receiving material from the tank and for discharging it on the opposite side of said feed grinder, means for conveying the crushed material from the grinder, control means actuable in accordance with the quantity of material being handled by said tank, said feed grinder and said conveying means for starting and stopping operation of said feed grinder and said conveying means when said tank is substantially empty, a supporting member carrying at least the weight of said tank, spring means biasing said member upwardly, said control means for starting and stopping operation of said feed grinder and said conveying means comprising electrical contact means actionable upon changes in elevation of said supporting member.

2. A mashing device, comprising a receiving tank for malt, a feed grinder located in alignment with said tank in a position for receiving material from the tank and for discharging it on the opposite side of said feed grinder, means for transferring the crushed material from the grinder, means for starting and stopping said feed grinder and said conveying means comprising a supporting member carrying said tank, said feed grinder and said conveying means, and electrical contact means operable in accordance with the position of said member for actuating said feed grinder and said transferring means.

3. A device according to claim 2, wherein said electrical contact means includes a contact carried by said supporting member and movable therewith and a fixed contact located in alignment therewith.

4. A mashing device, comprising a receiving tank for malt, a feed grinder located in alignment with said tank in a position for receiving material from the tank and for discharging crushed malt to the side opposite said feed grinder, means for conveying the crushed malt from the grinder, means for operating said feed grinder and said conveying means in accordance with the amount of malt in said tank, comprising a member on which at least said tank is supported, spring means urging said member upwardly, said member being movable upwardly upon reduction in the content of the malt in said tank, and electrical contact means actuable by the upward movement of said platform to discontinue said feed grinder and said conveying means.

5. A device according to claim 4, wherein said member is a platform, and said tank, said feed grinder, and said conveying means are all supported on said platform.

6. A device according to claim 5, including stops for limiting the downward movement of said platform.

References Cited

UNITED STATES PATENTS

| | | | |
|---|---|---|---|
| 1,501,204 | 7/1924 | Mier | 137—396 |
| 2,232,404 | 2/1941 | Pratt | 259—163 |
| 2,343,706 | 3/1944 | Reich | 99—278 |
| 2,727,733 | 12/1955 | Carswell | 259—154 |
| 2,946,574 | 7/1960 | Munderich | 259—154 |
| 3,128,189 | 4/1964 | Watts et al. | 99—278 |
| 3,249,443 | 5/1966 | Reiter | 99—278 |

WALTER A. SCHEEL, *Primary Examiner.*

ROBERT W. JENKINS, *Examiner.*